United States Patent
Wang et al.

(10) Patent No.: US 10,409,106 B2
(45) Date of Patent: Sep. 10, 2019

(54) DISPLAY PANEL, OPERATING METHOD THEREOF AND DISPLAY DEVICE

(71) Applicant: BOE TECHNOLOGY GROUP CO., LTD., Beijing (CN)

(72) Inventors: Xinxing Wang, Beijing (CN); Jikai Yao, Beijing (CN); Hua Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 138 days.

(21) Appl. No.: 15/512,427

(22) PCT Filed: Nov. 3, 2016

(86) PCT No.: PCT/CN2016/098535
§ 371 (c)(1),
(2) Date: Mar. 17, 2017

(87) PCT Pub. No.: WO2017/128725
PCT Pub. Date: Aug. 3, 2017

(65) Prior Publication Data
US 2018/0149917 A1 May 31, 2018

(30) Foreign Application Priority Data
Jan. 25, 2016 (CN) .......................... 2016 1 0048450

(51) Int. Cl.
*G02F 1/1335* (2006.01)
*F21V 8/00* (2006.01)

(52) U.S. Cl.
CPC ...... *G02F 1/133536* (2013.01); *G02B 6/0055* (2013.01); *G02B 6/0056* (2013.01);
(Continued)

(58) Field of Classification Search
CPC ............. G02F 1/1335; G02F 1/133536; G02F 2001/133616
See application file for complete search history.

(56) References Cited

U.S. PATENT DOCUMENTS

| | | | |
|---|---|---|---|
| 2001/0024253 A1* | 9/2001 | Ishihara | G02F 1/133615 349/113 |
| 2003/0016317 A1 | 1/2003 | Kotchick et al. | |

(Continued)

FOREIGN PATENT DOCUMENTS

| | | |
|---|---|---|
| CN | 1315012 A | 9/2001 |
| CN | 1537253 A | 10/2004 |

(Continued)

OTHER PUBLICATIONS

International Search Report and Written Opinion (including English translation of Box V) dated Dec. 27, 2016, for corresponding PCT Application No. PCT/CN2016/098535.

(Continued)

*Primary Examiner* — James A Dudek
(74) *Attorney, Agent, or Firm* — Kinney & Lange, P.A.

(57) ABSTRACT

The present disclosure provides a display panel, an operating method thereof and a display device. The display panel includes first substrate and second substrate disposed opposite to each other, liquid crystal layer disposed between first substrate and second substrate, orthogonal polarization layer disposed on a side of first substrate facing towards liquid crystal layer, and first absorbent layer disposed on a side of first substrate facing away from liquid crystal layer. When no electric field is loaded, both liquid crystal layer and orthogonal polarization layer transmit light with first polarization direction. When electric field is loaded, liquid crystal layer converts incident light with first polarization direction into emergent light with second polarization direction which is orthogonal to first polarization direction, and the orthogo- (Continued)

nal polarization layer reflects the light with the second polarization direction. The first absorbent layer absorbs the light incident thereon.

10 Claims, 7 Drawing Sheets

(52) U.S. Cl.
CPC .......... *G02B 6/0088* (2013.01); *G02B 6/0091* (2013.01); *G02B 6/0095* (2013.01); *G02F 1/133512* (2013.01); *G02F 2001/133565* (2013.01); *G02F 2201/30* (2013.01); *G02F 2203/02* (2013.01); *G02F 2203/64* (2013.01)

(56) References Cited

U.S. PATENT DOCUMENTS

| | | | | |
|---|---|---|---|---|
| 2003/0210369 | A1* | 11/2003 | Wu | G02F 1/133555 349/114 |
| 2004/0005916 | A1* | 1/2004 | Choi | H04M 1/0214 455/575.3 |
| 2008/0094547 | A1 | 4/2008 | Sugita et al. | |
| 2009/0316070 | A1 | 12/2009 | Hwang et al. | |
| 2014/0160396 | A1 | 6/2014 | Chung et al. | |
| 2015/0198833 | A1* | 7/2015 | Chung | G02B 5/3058 349/67 |
| 2017/0082895 | A1 | 3/2017 | Sakai et al. | |

FOREIGN PATENT DOCUMENTS

| | | |
|---|---|---|
| CN | 1678949 A | 10/2005 |
| CN | 1866104 A | 11/2006 |
| CN | 103838029 A | 6/2014 |
| CN | 104570466 A | 4/2015 |
| CN | 105446001 A | 3/2016 |
| CN | 106133587 A | 11/2016 |

OTHER PUBLICATIONS

First Chinese Office Action, for Chinese Patent Application No. 201610048450.7, dated Jan. 31, 2018, 16 pages.

* cited by examiner

DISPLAY PANEL, OPERATING METHOD THEREOF AND DISPLAY DEVICE

CROSS-REFERENCE TO RELATED APPLICATION

This application is a Section 371 National Stage Application of International Application No. PCT/CN2016/098535, filed on Sep. 9, 2016, entitled "DISPLAY PANEL, OPERATING METHOD THEREOF AND DISPLAY DEVICE", which has not yet published, which claims priority to Chinese Application No. 201610048450.7, filed on Jan. 25, 2016, incorporated herein by reference in their entirety.

BACKGROUND OF THE DISCLOSURE

Field of the Disclosure

The present disclosure relates to a technical field of display, more particularly, to a display panel, an operating method of the display panel, and a display device.

Description of the Related Art

With an increasing development of intelligent wearable devices, a demand on an integration of functions of the intelligent wearable devices is getting higher and higher.

However, liquid crystal display products used in existing intelligent wearable devices generally adopt liquid crystal display panels in a normally white (abbreviated as NW) mode. The liquid crystal display panel in a normally white mode presents a white state when it is in a non-operating state, that is, it allows light to be transmitted when no voltage is applied, resulting in a low-contrast image to be displayed in the liquid crystal display panel.

SUMMARY

In order to address above defects, embodiments of the present disclosure provide a display panel, an operating method of the display panel and a display device.

Thus, the present disclosure provides a display panel comprising a first substrate and a second substrate disposed opposite to each other, a liquid crystal layer provided between the first substrate and the second substrate, an orthogonal polarization layer provided on a side of the first substrate facing towards the liquid crystal layer, and a first absorbent layer provided on a side of the first substrate facing away from the liquid crystal layer, wherein, the liquid crystal layer is configured to transmit light with a first polarization direction when no electric field is loaded and to convert incident light with the first polarization direction into emergent light with a second polarization direction which is orthogonal to the first polarization direction when an electric field is loaded, and wherein, the orthogonal polarization layer is configured to transmit the light with the first polarization direction and reflect the light with the second polarization direction, and the first absorbent layer is configured to absorb light incident on the first absorbent layer.

Optionally, the orthogonal polarization layer comprises a plurality of grating elements which are disposed parallel to each other to form a grating element array.

Optionally, the first absorbent layer is formed from black ink.

Optionally, the display panel further comprises a polarizer disposed on the side of the second substrate facing away from the liquid crystal layer, wherein the polarizer is configured to convert light transmitted thought it into the light with the first polarization direction.

The present disclosure further provides a display device comprising a backlight module and the display panel according to any one of the above embodiments, wherein, the backlight module is disposed at a side of the second substrate of the display panel facing away from the liquid crystal layer and configured to provide backlight when an ambient light intensity is lower than a predefined light intensity.

Optionally, the backlight module comprises a light source and a light guide plate, the light guide plate being disposed at a side of the second substrate facing away from the liquid crystal layer, and the light source being disposed at a light incident side of the light guide plate.

Optionally, the display device further comprises a cover plate which is rotatably connected to the display panel through a first rotary shaft, the cover plate comprising a first face and a second face disposed opposite to each other.

Optionally, the cove plate is rotatable about the first rotary shaft to the side of the first substrate of the display panel facing away from the liquid crystal layer such that the first face of the cover plate is opposite to the first substrate and the first face of the cover plate is closer to the liquid crystal layer than a second face of the cover plate, and wherein, the cove plate is also rotatable about the first rotary shaft to the side of the second substrate of the display panel facing away from the liquid crystal layer such that the second face of the cover plate is opposite to the second substrate and the second face of the cover plate is closer to the liquid crystal layer than the first face of the cover plate.

Optionally, the first absorbent layer is disposed on the first face of the cover plate, and the second face of the cover plate is provided with a second absorbent layer which is configured to absorb light incident on the second absorbent layer.

Optionally, the second absorbent layer is formed from black ink.

Optionally, the cover plate comprises a first cover sub-plate and a second cover sub-plate disposed opposite to each other, and a control circuit board is provided between the first cover sub-plate and the second cover sub-plate and connected to the display panel through a binding member. In an example, a surface of the first cover sub-plate facing away from the control circuit board is the first face of the cover plate and a surface of the second cover sub-plate facing away from the control circuit board is the second face of the cover plate.

Optionally, the display device further comprises a polarizer disposed on the side of the second substrate facing away from the liquid crystal layer and disposed between the second substrate and the light guide plate, wherein the polarizer is configured to convert light transmitted thought it into the light with the first polarization direction.

The present disclosure further provides an operating method of a display panel, wherein, the display panel comprises a first substrate and a second substrate disposed opposite to each other, a liquid crystal layer provided between the first substrate and the second substrate, an orthogonal polarization layer provided on a side of the first substrate facing towards the liquid crystal layer, and a first absorbent layer provided on a side of the first substrate facing away from the liquid crystal layer, wherein, the operating method comprises:

transmitting light with a first polarization direction through both the liquid crystal layer and the orthogonal polarization layer when no electric field is loaded;

when an electric field is loaded, converting an incident light with the first polarization direction into an emergent light with a second polarization direction which is orthogonal to the first polarization layer by the liquid crystal layer, reflecting the light with the second polarization direction by the orthogonal polarization layer, then converting an incident light with the second polarization direction into an emergent light with the first polarization direction by the liquid crystal layer; and absorbing light incident on the first absorbent layer by the first absorbent layer.

The present disclosure further provides an operating method of the display device, comprising:

when no electric field is loaded, transmitting ambient light and/or light emitted from the light source through the light guide plate and the polarizer to form light with a first polarization direction, transmitting the light with the first polarization direction by both the liquid crystal layer and the orthogonal polarization layer, and absorbing the light with the first polarization direction by the first absorbent layer when the light with the first polarization direction is incident on the first absorbent layer so as to present a normally black state; and when an electric field is loaded, transmitting ambient light and/or light emitted from the light source through the light guide plate and the polarizer to form the light with the first polarization direction, converting an incident light with the first polarization direction into an emergent light with a second polarization direction by the liquid crystal layer, reflecting the light with the second polarization direction by the orthogonal polarization layer, then converting an incident light with the second polarization direction into an emergent light with the first polarization direction by the liquid crystal layer, and transmitting the light with the first polarization direction through the light guide plate and the polarizer so as to realize a display function.

DETAILED DESCRIPTION OF PREFERRED EMBODIMENTS OF THE DISCLOSURE

In order to make those skilled in the art have a better understanding of technical solutions of the present disclosure, a display panel, an operating method of the display panel and a display device according to the present disclosure will be described in detail with reference to accompanying drawings.

Figure 1:
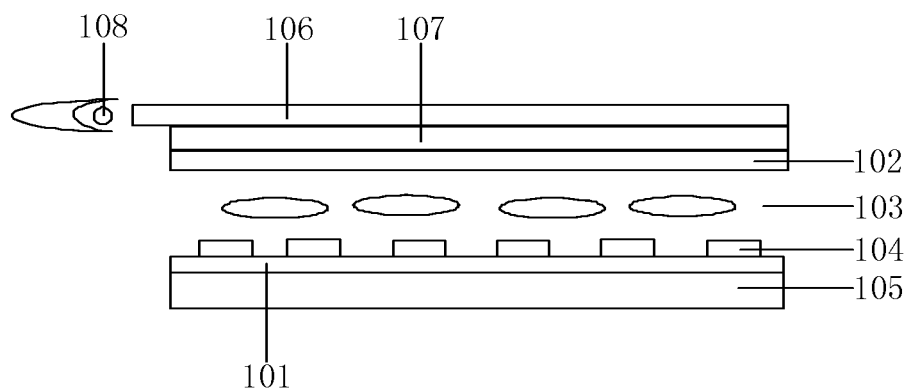
FIG. 1 is a schematic structural view of a display panel according to an embodiment of the present disclosure.

FIG. 1 is a schematic structural view of a display panel according to an embodiment of the present disclosure. As shown in FIG. 1, the display panel comprises a first substrate 101 and a second substrate 102 disposed opposite to each other. A liquid crystal layer 103 is disposed between the first substrate 101 and the second substrate 102. Optionally, the liquid crystal layer 103 comprises advanced super dimension switch-liquid crystal (abbreviated as ADS-liquid crystal). An orthogonal polarization layer 104 is provided on a side of the first substrate 101 facing towards the liquid crystal layer 103, and a first absorbent layer 105 is provided on a side of the first substrate 101 facing away from the liquid crystal layer 103. As the liquid crystal layer 103 is provided, the display panel in the embodiment may also be referred to as a liquid crystal display panel.

It should be noted that a position of the first absorbent layer 105 is not permanent in actual applications. The first absorbent layer 105 is not necessarily disposed on the side of the first substrate 102 facing away from the liquid crystal layer 103. The position of the first absorbent layer 105 may be changed according to actual demands. In the embodiment, the first absorbent layer 105 is disposed on the side of the first substrate 102 facing away from the liquid crystal layer 103 so as to realize a normally black (abbreviated as NB) mode for the display panel. A display state of the display panel in the normally black mode will be described in detail below. The display panel in the normally black mode presents a black state when it is in a non-operating state, that is, it does not allow light to be transmitted when no voltage is applied.

It is apparent that the first absorbent layer 105 can be disposed on other positions so as to achieve other functions. For example, the first absorbent layer 105 may be disposed on a cover plate so as to achieve a double-sided display function including a normal display and a mirror display, which will be described in detail below.

In the embodiment, the orthogonal polarization layer 104 may be a wire-grid polarizer (abbreviated as WGP). The wire-grid polarizer is an optical device which is used for transmitting light with a specific polarization direction and reflecting light with a polarization direction orthogonal to the specific polarization direction. The wire-grid polarizer includes a plurality of grating elements which are arranged parallel to each other so as to form a grating element array. The wire-grid polarizer is capable of reflecting light which has a light field vector parallel to the grating element and transmitting light which has a light field vector orthogonal to the grating element. Optionally, the first absorbent layer 105 may be a black ink layer, in other words, the first absorbent layer 105 may be formed from black ink.

In the embodiment, the liquid crystal layer 103 is configured to transmit light with a first polarization direction when no electric field is loaded and to convert incident light with the first polarization direction into emergent light with a second polarization direction when an electric field is loaded, wherein the first polarization direction is orthogonal to the second polarization direction. The orthogonal polarization layer 104 is configured to transmit light with the first polarization direction and reflect light with the second polarization direction. The first absorbent layer 105 is configured to absorb light incident onto the first absorbent layer.

Figure 2:
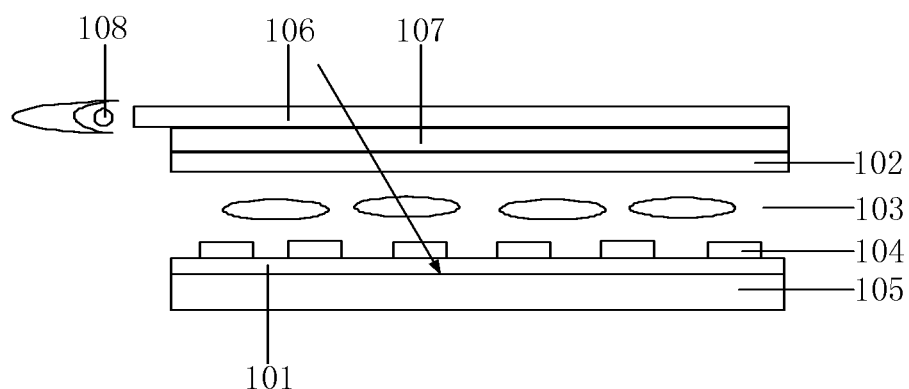
FIG. 2 and FIG. 3 are schematic views of the display panel shown in FIG. 1 with NB mode in an outdoor display state.
Figure 3:
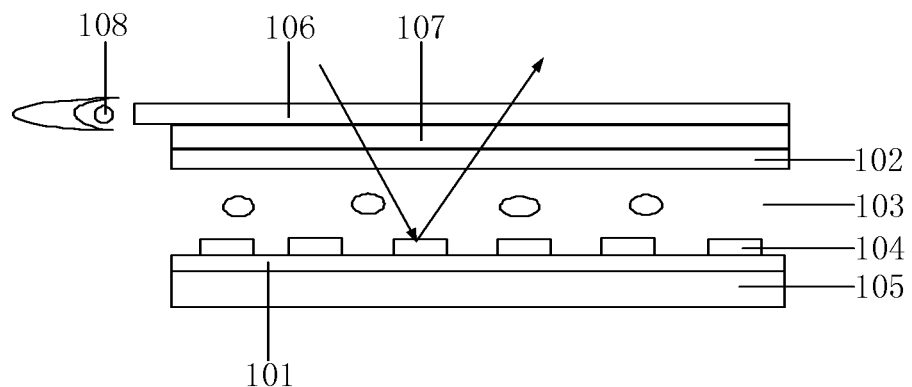

FIG. 2 and FIG. 3 are schematic views of the display panel shown in FIG. 1 with NB mode in an outdoor display state. A polarizer 107 and a light guide plate 106 are provided in order on a side of the second substrate 102 facing away from the liquid crystal layer 103. As shown in FIG. 2, when no electric field is loaded, ambient light is transmitted through the light guide plate 106 and the polarizer 107 to form light with the first polarization direction, and the light with the first polarization direction is transmitted to the first absorbent layer 105 through the liquid crystal layer 103 and the orthogonal polarization layer 104, then the light with the first polarization direction is absorbed by the first absorbent layer 105 so that the display panel presents a normally black state. As shown in FIG. 3, when an electric field is loaded, the ambient light is transmitted through the light guide plate 106 and the polarizer 107 to form light with the first polarization direction. At this time, the liquid crystal layer 103 functions as a $$\frac{\lambda}{2}$$

phase retardation film, which is configured to convert the incident light with the first polarization direction into the emergent light with the second polarization direction which is orthogonal to the first polarization direction. The light with the second polarization direction is reflected by the orthogonal polarization layer 104 as the second polarization direction is orthogonal to the first polarization direction. The liquid crystal layer 103 then converts an incident light with the second polarization direction into an emergent light with the first polarization direction. The light with the first polarization direction is transmitted through the light guide plate 106 and the polarizer 107 so as to realize a display function. Therefore, the display panel according to the embodiment is in the normally black mode in the outdoor environment, that is, it presents a black state when it is not operating, so that a contrast of an image to be displayed is increased.

Figure 4:
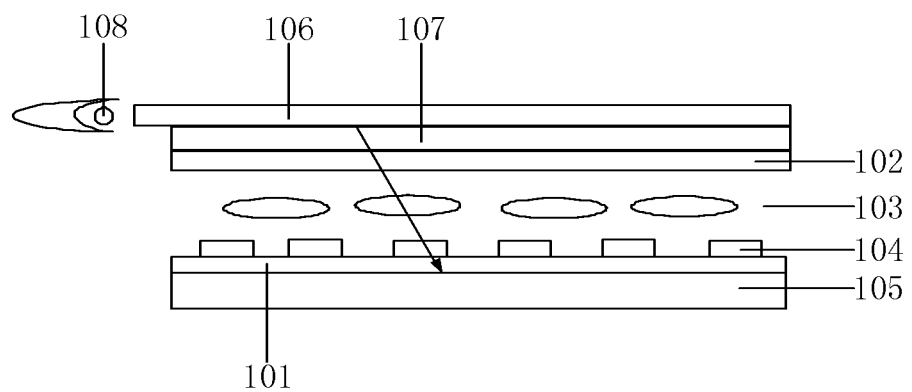
FIG. 4 and FIG. 5 are schematic views of the display panel shown in FIG. 1 with NB mode in a dark room display state.
Figure 5:
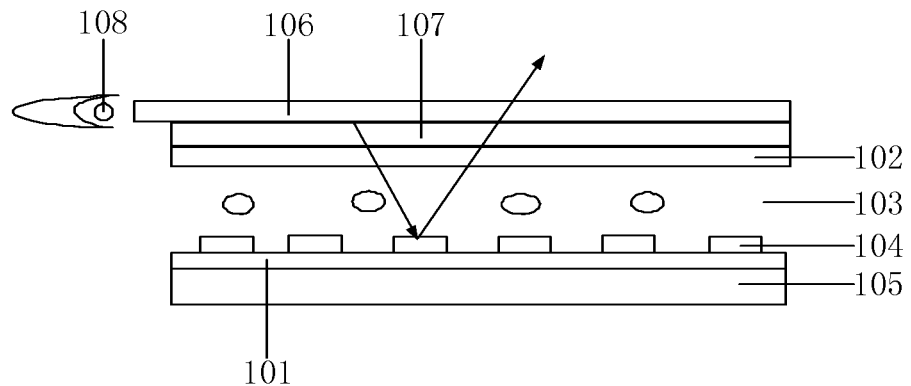

FIG. 4 and FIG. 5 are schematic views of the display panel shown in FIG. 1 with NB mode in a dark room state. The polarizer 107 and the light guide plate 106 are provided in order on the side of the second substrate 102 facing away from the liquid crystal layer 103, and a light source 108 is provided at a light incident side of the light guide plate 106. As shown in FIG. 4, when no electric field is loaded, light emitted from the light source 108 is transmitted through the polarizer 107 to form light with the first polarization direction, and the light with the first polarization direction is transmitted to the first absorbent layer 105 through the liquid crystal layer 103 and the orthogonal polarization layer 104, then the light with the first polarization direction is absorbed by the first absorbent layer 105 so that the display panel presents a normally black state. As shown in FIG. 5, when an electric field is loaded, light emitted from the light source 108 is transmitted through the polarizer 107 to form light with the first polarization direction. At this time, the liquid crystal layer 103 functions as a $$\frac{\lambda}{2}$$

phase retardation film, which is configured to convert the incident light with the first polarization direction into the emergent light with the second polarization direction which is orthogonal to the first polarization direction. The light with the second polarization direction is reflected by the orthogonal polarization layer 104 as the second polarization direction is orthogonal to the first polarization direction. The liquid crystal layer 103 then converts an incident light with the second polarization direction into an emergent light with the first polarization direction. The light with the first polarization direction is transmitted through the polarizer 107 so as to realize a display function. Therefore, the display panel according to the embodiment is in the normally black mode in the dark room environment, that is, it presents a black state when it is not operating, so that a contrast of an image to be displayed is increased.

The display panel according to the embodiment comprises the first substrate and the second substrate disposed opposite to each other. The liquid crystal layer is disposed between the first substrate and the second substrate. The orthogonal polarization layer is disposed on the side of the first substrate facing towards the liquid crystal layer. The first absorbent layer is disposed on the side of the first substrate facing away from the liquid crystal layer. When no electric field is loaded, both the liquid crystal layer and the orthogonal polarization layer transmit the light with the first polarization direction. When the electric field is loaded, the liquid crystal layer converts the incident light with the first polarization direction into the emergent light with the second polarization direction which is orthogonal to the first polarization direction, and the orthogonal polarization layer reflects the light with the second polarization direction. The first absorbent layer absorbs the light incident thereon. Therefore, the embodiment provides a liquid crystal display panel with NB mode. The liquid crystal display panel with NB mode presents a black state when it is not operating so that the contrast of the image to be displayed is increased.

Figure 6:
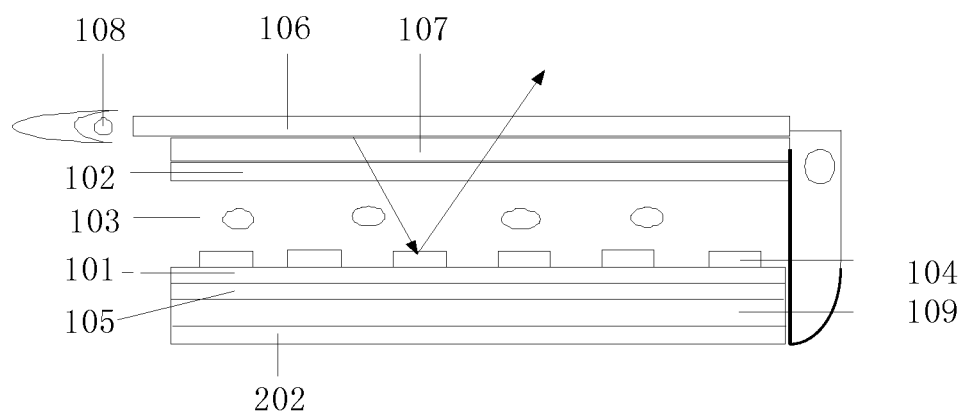
FIG. 6 is a schematic view of a display device according to another embodiment of the present disclosure with NB mode in a dark room display state.
Figure 7:
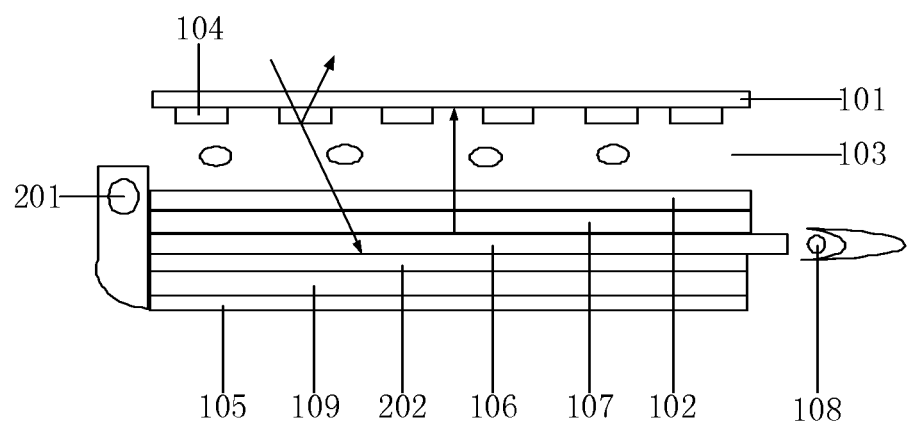
FIG. 7 is a schematic view of a display device according to another embodiment of the present disclosure in a mirror display mode when it is in a dark state in which a light intensity inside the display device is lower than a light intensity outside the display device.
Figure 8:
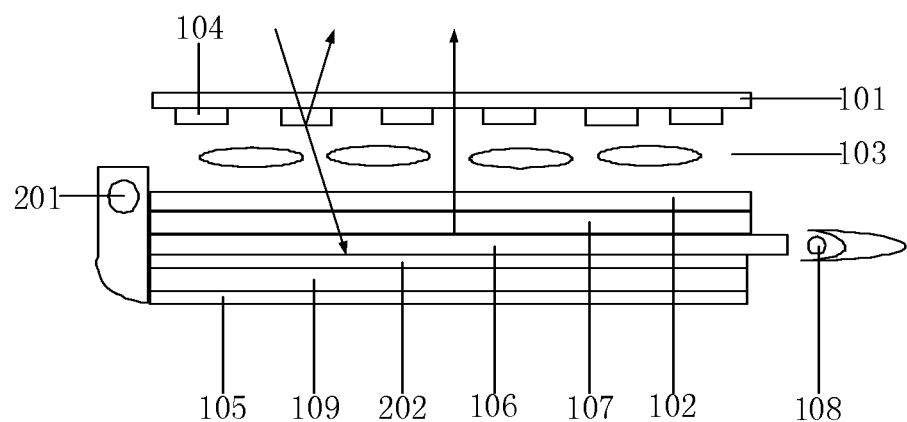
FIG. 8 is a schematic view of the display device according to another embodiment of the present disclosure in the mirror display mode when it is in a bright state in which a light intensity inside the display device is higher than a light intensity outside the display device.

FIG. 6 is a schematic view of a display device according to another embodiment of the present disclosure with NB mode in a dark room display state. FIG. 7 is a schematic view of a display device according to another embodiment of the present disclosure in a mirror display mode when it is in a dark state in which a light intensity inside the display device is lower than a light intensity outside the display device. FIG. 8 is a schematic view of the display device according to another embodiment of the present disclosure in the mirror display mode when it is in a bright state in which a light intensity inside the display device is higher than a light intensity outside the display device. As shown in FIGS. 6-8, the display device comprises a backlight module and the display panel illustrated in FIGS. 1-5. Specific structures of the display panel may refer to the above description with regard to FIGS. 1-5, and they are omitted here. The backlight module is disposed at a side of the second substrate of the display panel facing away from the liquid crystal layer and configured to provide backlight when the ambient light intensity is lower than a predefined light intensity. Optionally, the backlight module comprises a light source 108 and a light guide plate 106. The light guide plate 106 is disposed on the side of the second substrate 102 facing away from the liquid crystal layer 103, and the light source 108 is disposed at a light incident side of the light guide plate 106.

In the embodiment, the display device may further comprise a cover plate 109 which is rotatably connected to the display panel through a first rotary shaft 201. The cover plate 109 may be rotated about the first rotary shaft 201 to the side of the first substrate 101 of the display panel facing away from the liquid crystal layer 103 so that a first face of the cover plate 109 is opposite to the first substrate 101, as shown in FIG. 6. In this state, the first face of the cover plate 109 is closer to the liquid crystal layer 103 than a second face of the cover plate 109. Further, the cover plate 109 may be rotated about the first rotary shaft 201 to the side of the second substrate 102 of the display panel facing away from the liquid crystal layer 103 so that the second face of the cover plate 109 is opposite to the second substrate 102. In this state, the second face of the cover plate 109 is closer to the liquid crystal layer 103 than the first face of the cover plate 109, as shown in FIGS. 7 and 8. The first absorbent layer 105 is disposed on the first face of the cover plate 109 to absorb light incident on the first absorbent layer. A second absorbent layer 202 is provided on the second face of the cover plate 109 to absorb light incident on the second absorbent layer. As a result, the first absorbent layer 105 is positioned on the side of the first substrate 101 facing away from the liquid crystal layer when the first face of the cover plate 109 is opposite to the first substrate 101 (referring to FIG. 6), and the second absorbent layer 202 is positioned on the side of the light guide plate 106 facing away from the liquid crystal layer when the second face of the cover plate 109 is opposite to the second substrate 102 (referring to FIGS. 7-8). In this way, positions of the first absorbent layer 105 and the second absorbent layer 202 may be changed as the cover plate 109 is rotated, so as to realize a double-sided display function including a normal display and a mirror display. Specific implementations of the normal display may refer to the above descriptions with regard to FIG. 5. Specific implementations of the double-sided display function will be described in detail hereinafter. Optionally, the second absorbent layer 202 may be a black ink layer, in other words, the second absorbent layer 202 may be formed from black ink.

In the embodiment, the display device is in a normal display mode when the first face of the cover plate 109 is opposite to the first substrate 101 (referring to FIG. 6), and the display device is in a mirror display mode when the second face of the cover plate 109 is opposite to the second substrate 102 (referring to FIGS. 7 and 8). In the normal display mode, the display function is realized by means of bright and dark states of pixels, specifically, different pixels are respectively in the bright state and in the dark state to form an image to be displayed. In the mirror display mode, the display function is realized by means of a display state and a mirror state, specifically, different pixels are respectively in the display state and in the mirror state to form an image to be displayed. Since light is reflected in the mirror state and the reflection may be disturbed by the display, the mirror effect is presented only in non-display state. The non-display state corresponds to a dark state in the normal display mode, thus the dark state and the bright state in the normal display mode correspond to the mirror state and the display state in the mirror display mode, respectively.

Referring to FIG. 7, the display panel is in the dark state, that is, the display panel is in a lightless state. At this time, the light intensity inside the display panel is lower than the light intensity outside the display panel. The orthogonal polarization layer 104 transmits light with the first polarization direction in outside light and reflects light with the second polarization direction in the outside light. The liquid crystal layer 103 transmits the light with the first polarization direction. The light with the first polarization direction is absorbed by the polarizer 107 or the second absorbent layer 202. In this case, the liquid crystal layer 103 allows the light emitted from the light source 108 not to be transmitted so that the display panel presents the mirror state.

Referring to FIG. 8, the display panel is in the bright state, that is, the display panel is in a light-emitting state. At this time, the light intensity inside the display panel is higher than the light intensity outside the display panel. The orthogonal polarization layer 104 transmits light with the first polarization direction in outside light and reflects light with the second polarization direction in the outside light. The liquid crystal layer 103 transmits the light with the first polarization direction. The light with the first polarization direction is absorbed by the polarizer 107 or the second absorbent layer 202. In this case, the liquid crystal layer 103 allows the light emitted from the light source 108 to be transmitted so that the display panel presents the display state.

Therefore, different pixels are respectively in the display state and in the mirror state to form the image to be displayed. With the mirror display function of the display device according to the embodiment, a user may not only observe an image to be displayed, but also observe a reflected image, for example, the user himself/herself. Thus, the display device according to the embodiment may be applied to a dressing room, a leisure and recreational facility and a vehicle display.

Figure 9:
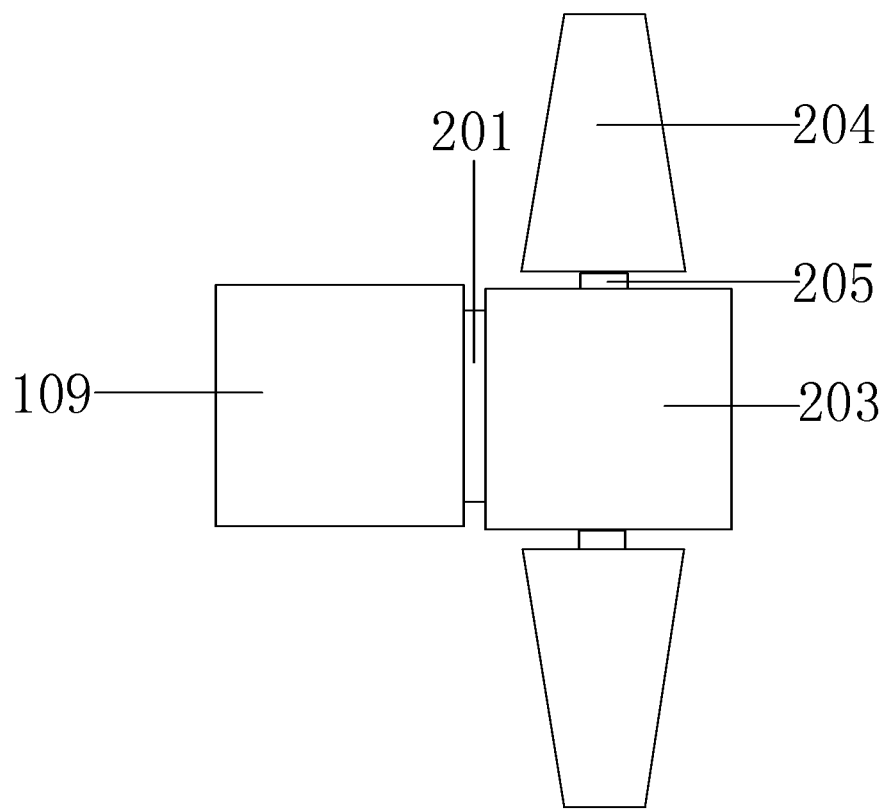
FIG. 9 and FIG. 10 are schematic views showing two expanded structures of the display device shown in FIG. 7 and FIG. 8.
Figure 10:
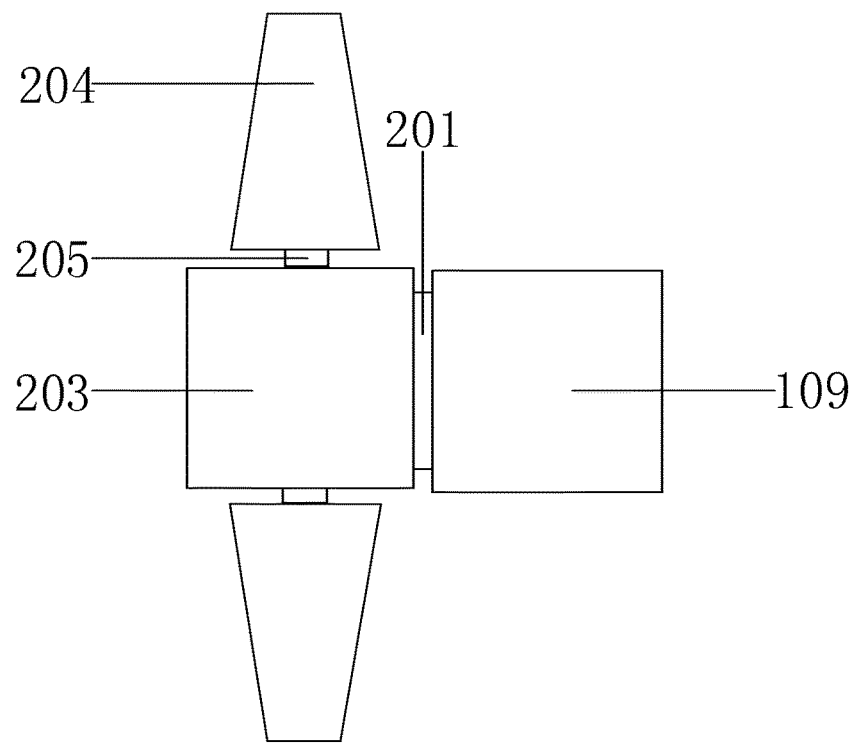
Figure 11:
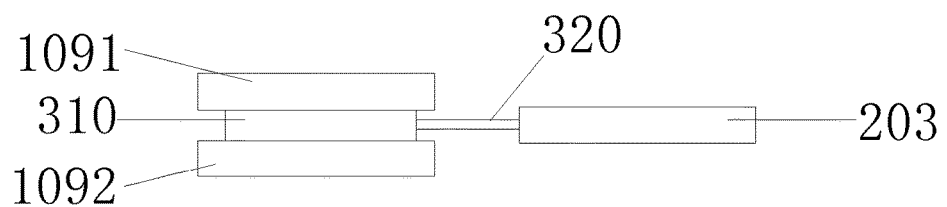
FIG. 11 is a schematic view of a cover plate of the display device according to the embodiment of the present disclosure.

FIG. 9 and FIG. 10 are schematic views showing two expanded structures of the display device shown in FIG. 7 and FIG. 8. As shown in FIGS. 9 and 10, the cover plate 109 is rotatably connected to the display panel 203 through the first rotary shaft 201. A binding tape 204 is rotatably connected to the display panel 203 through a second rotary shaft 205 and configured to secure the cover plate 109 when the cover plate 109 is rotated to the side of the first substrate 101 of the display panel facing away from the liquid crystal layer 103 or to the side of the second substrate 102 of the display panel facing away from the liquid crystal layer 103. As shown in FIG. 11, in an example, the cover plate 109 comprises a first cover sub-plate 1091 and a second cover sub-plate 1092 disposed opposite to each other. A control circuit board 310 is provided between the first cover sub-plate 1091 and the second cover sub-plate 1092. The control circuit board 310 is connected to the display panel 203 through a binding member 320. In an example, a surface of the first cover sub-plate 1091 facing away from the control circuit board 310 is the first face of the cover plate 109 and a surface of the second cover sub-plate 1092 facing away from the control circuit board 310 is the second face of the cover plate 109.

In the display device according to the embodiment, the display panel comprises the first substrate and the second substrate disposed opposite to each other. The liquid crystal layer is disposed between the first substrate and the second substrate. The orthogonal polarization layer is disposed on the side of the first substrate facing towards the liquid crystal layer. The first absorbent layer is disposed on the side of the first substrate facing away from the liquid crystal layer. When no electric field is loaded, both the liquid crystal layer and the orthogonal polarization layer transmit the light with the first polarization direction. When the electric field is loaded, the liquid crystal layer converts the incident light with the first polarization direction into the emergent light with the second polarization direction which is orthogonal to the first polarization direction, and the orthogonal polarization layer reflects the light with the second polarization direction. The first absorbent layer absorbs the light incident thereon. Therefore, the embodiment provides a liquid crystal display device with NB mode. The liquid crystal display device with NB mode presents a black state when it is not operating so that the contrast of the image to be displayed is increased. Further, the display device according to the embodiment of the present disclosure is capable of realizing a double-sided display function including a normal display and a mirror display. In the normal display state, the display device with NB mode presents the black state when it is not operating so that the contrast of the image to be displayed is increased. In the mirror display state, a user may not only observe an image to be displayed, but also observe a reflected image, so that the display device according to the embodiment may be applied to intelligent wearable devices, thereby satisfying multi-demands including personal care and information process.

Figure 12:
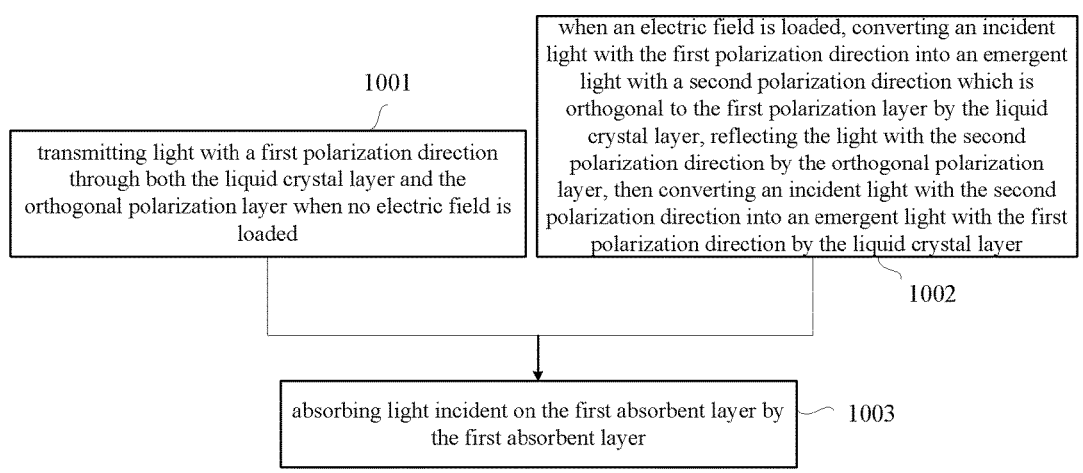
FIG. 12 is a flow chart of an operating method of the display panel according to the embodiment of the present disclosure.

FIG. 12 is a flow chart of an operating method of a display panel according to a further embodiment of the present disclosure. The display panel comprises a first substrate and a second substrate disposed opposite to each other, a liquid crystal layer provided between the first substrate and the second substrate, an orthogonal polarization layer provided on a side of the first substrate facing towards the liquid crystal layer, and a first absorbent layer provided on a side of the first substrate facing away from the liquid crystal layer.

As shown in FIG. 12, the operating method comprises the following steps S1001 to S1003.

In the step S1001, the liquid crystal layer transmits the light with the first polarization direction and the orthogonal polarization layer transmits the light with the first polarization direction when no electric field is loaded.

In the step S1002, when an electric field is loaded, the liquid crystal layer converts the incident light with the first polarization direction into the emergent light with the second polarization direction which is orthogonal to the first polarization direction, the orthogonal polarization layer reflects the light with the second polarization direction, then the liquid crystal layer converts the incident light with the second polarization direction into the emergent light with the first polarization direction.

In the step S1003, the first absorbent layer absorbs the light incident on the first absorbent layer.

Referring to FIG. 2, in the outdoor environment, when no electric field is loaded, the ambient light is transmitted through the light guide plate 106 and the polarizer 107 to form the light with the first polarization direction, the light with the first polarization direction is transmitted through both the liquid crystal layer 103 and the orthogonal polarization layer 104, then the light with the first polarization direction is incident on the first absorbent layer 105 and is absorbed by the first absorbent layer 105, so that the display panel presents the normally black state. Therefore, the display panel according to the embodiment is in the normally black mode in the outdoor environment, that is, it presents the black state when it is not operating, so that the contrast of the image to be displayed is increased.

Referring to FIG. 4, in the dark room environment, when no electric field is loaded, the light emitted from the light source 108 is transmitted through the polarizer 107 to form the light with the first polarization direction, the light with the first polarization direction is transmitted through both the liquid crystal layer 103 and the orthogonal polarization layer 104, then the light with the first polarization direction is incident on the first absorbent layer 105 and is absorbed by the first absorbent layer 105, so that the display panel presents the normally black state. Therefore, the display panel according to the embodiment is in the normally black mode in the dark room environment, that is, it presents the black state when it is not operating, so that the contrast of the image to be displayed is increased.

Referring to FIG. 3, in the outdoor environment, when the electric field is loaded, the ambient light is transmitted through the light guide plate 106 and the polarizer 107 to form the light with the first polarization direction. At this time, the liquid crystal layer 103 functions as a $$\frac{\lambda}{2}$$

phase retardation film, which is configured to convert the incident light with the first polarization direction into the emergent light with the second polarization direction which is orthogonal to the first polarization direction. The light with the second polarization direction is reflected by the orthogonal polarization layer 104 as the second polarization direction is orthogonal to the first polarization direction. The liquid crystal layer 103 then converts the incident light with the second polarization direction into the emergent light with the first polarization direction. The light with the first polarization direction is transmitted through the polarizer 107 and the light guide plate 106 so as to realize a display function.

Referring to FIG. 5, in the dark room environment, when the electric field is loaded, the light emitted from the light source 108 is transmitted through the polarizer 107 to form the light with the first polarization direction. At this time, the liquid crystal layer 103 functions as a $$\frac{\lambda}{2}$$

phase retardation film, which is configured to convert the incident light with the first polarization direction into the emergent light with the second polarization direction which is orthogonal to the first polarization direction. The light with the second polarization direction is reflected by the orthogonal polarization layer 104 as the second polarization direction is orthogonal to the first polarization direction. The liquid crystal layer 103 then converts the incident light with the second polarization direction into the emergent light with the first polarization direction. The light with the first polarization direction is transmitted through the polarizer 107 and the light guide plate 106 so as to realize a display function.

In the operating method of the display device according to the embodiment, the display panel comprises the first substrate and the second substrate disposed opposite to each other. The liquid crystal layer is disposed between the first substrate and the second substrate. The orthogonal polarization layer is disposed on the side of the first substrate facing towards the liquid crystal layer. The first absorbent layer is disposed on the side of the first substrate facing away from the liquid crystal layer. When no electric field is loaded, both the liquid crystal layer and the orthogonal polarization layer transmit the light with the first polarization direction. When the electric field is loaded, the liquid crystal layer converts the incident light with the first polarization direction into the emergent light with the second polarization direction which is orthogonal to the first polarization direction, and the orthogonal polarization layer reflects the light with the second polarization direction. The first absorbent layer absorbs the light incident thereon. Therefore, the liquid crystal display panel according to the embodiment is in the normally black mode. The liquid crystal display device with NB mode presents a black state when it is not operating so that the contrast of the image to be displayed is increased.

It can be understood that above embodiments are merely exemplary embodiments in order to explain a principle of the present disclosure, however, the present disclosure is not limited thereto. It is apparent to the skilled person in the art to make various modifications and changes of the present disclosure without departing the spirit and scope of the present disclosure. These modifications and changes shall also be considered falling into the scope of the present disclosure.

What is claimed is:

1. A display device comprising:
   a display panel comprising a first substrate and a second substrate disposed opposite to each other, a liquid crystal layer provided between the first substrate and the second substrate, and an orthogonal polarization layer provided on a side of the first substrate facing towards the liquid crystal layer;
   a backlight module disposed on a side of the second substrate of the display panel facing away from the liquid crystal layer and configured to provide backlight when an ambient light intensity is lower than a pre-defined light intensity; and
   a cover plate rotatably connected to the display panel through a first rotary shaft, the cover plate comprising a first face and a second face disposed opposite each other,
   wherein a first absorbent layer configured to absorb light incident on the first absorbent layer is disposed on the first face of the cover plate, and a second absorbent layer configured to absorb light incident on the second absorbent layer is disposed on the second face of the cover plate;
   wherein the liquid crystal layer is configured to transmit light with a first polarization direction when no electric field is loaded and to convert incident light with the first polarization direction into emergent light with a second polarization direction which is orthogonal to the first polarization direction when an electric field is loaded,
   wherein the orthogonal polarization layer is configured to transmit the light with the first polarization direction and reflect the light with the second polarization direction, and the first absorbent layer is configured to absorb light incident on the first absorbent layer, and
   wherein the cover plate is configured to switch between a first position where the cover plate is on a side of the first substrate of the display panel facing away from the liquid crystal layer and parallel to the first substrate and a second position where the cover plate is on a side of the second substrate of the display panel facing away from the liquid crystal layer and parallel to the second substrate, the display device is in a normal display mode in response to the cover plate being in the first position and is in a mirror display mode in response to the cover plate being in the second position.

2. The display device according to claim 1, wherein, the backlight module comprises a light source and a light guide plate, the light guide plate being disposed at the side of the second substrate facing away from the liquid crystal layer, and the light source being disposed at a light incident side of the light guide plate.

3. The display device according to claim 1, wherein, the second absorbent layer is formed from black ink.

4. The display device according to claim 1, wherein, the cover plate comprises a first cover sub-plate and a second cover sub-plate disposed opposite to each other, and
   wherein, a control circuit board is provided between the first cover sub-plate and the second cover sub-plate and connected to the display panel through a binding member.

5. The display device according to claim 4, wherein, a surface of the first cover sub-plate facing away from the control circuit board is the first face of the cover plate and a surface of the second cover sub-plate facing away from the control circuit board is the second face of the cover plate.

6. The display device according to claim 2, further comprising a polarizer disposed on the side of the second substrate facing away from the liquid crystal layer and disposed between the second substrate and the light guide plate, wherein the polarizer is configured to convert light transmitted thought it into the light with the first polarization direction.

7. An operating method of the display device according to claim 6, comprising:
   when no electric field is loaded, transmitting ambient light and/or light emitted from the light source through the light guide plate and the polarizer to form light with a first polarization direction, transmitting the light with the first polarization direction by both the liquid crystal layer and the orthogonal polarization layer, and absorbing the light with the first polarization direction by the first absorbent layer when the light with the first polarization direction is incident on the first absorbent layer so as to present a normally black state; and
   when an electric field is loaded, transmitting ambient light and/or light emitted from the light source through the light guide plate and the polarizer to form the light with the first polarization direction, converting an incident light with the first polarization direction into an emergent light with a second polarization direction by the liquid crystal layer, reflecting the light with the second polarization direction by the orthogonal polarization layer, then converting an incident light with the second polarization direction into an emergent light with the first polarization direction by the liquid crystal layer, and transmitting the light with the first polarization direction through the light guide plate and the polarizer so as to realize a display function.

8. The display device according to claim 1, wherein, the cover plate is rotatable about the first rotary shaft to the side of the first substrate of the display panel facing away from the liquid crystal layer such that the first face of the cover plate is opposite to the first substrate and the first face of the cover plate is closer to the liquid crystal layer than the second face of the cover plate, and
   wherein, the cove plate is also rotatable about the first rotary shaft to the side of the second substrate of the display panel facing away from the liquid crystal layer such that the second face of the cover plate is opposite to the second substrate and the second face of the cover plate is closer to the liquid crystal layer than the first face of the cover plate.

9. The display device according to claim 1, wherein, the orthogonal polarization layer comprises a plurality of grating elements which are disposed parallel to each other to form a grating element array.

10. The display device according to claim 1, wherein, the first absorbent layer is formed from black ink.

* * * * *